United States Patent [19]

Bergler et al.

[11] 4,262,421
[45] Apr. 21, 1981

[54] KEYHOLE SAW

[75] Inventors: Otto Bergler; Eugen Lutz, both of Mühlacker-Lomersheim, Fed. Rep. of Germany

[73] Assignee: Eugen Lutz GmbH & Co. Maschinenfabrik, Mühlacker, Fed. Rep. of Germany

[21] Appl. No.: 87,763

[22] Filed: Oct. 24, 1979

Related U.S. Application Data

[63] Continuation-in-part of Ser. No. 932,858, Aug. 11, 1978, abandoned.

[51] Int. Cl.³ ............................................. B27B 11/02
[52] U.S. Cl. ........................................... 30/393; 74/50
[58] Field of Search ................... 30/393, 394, 392; 74/50

[56] References Cited

U.S. PATENT DOCUMENTS

| | | | |
|---|---|---|---|
| 2,775,272 | 12/1956 | Papworth | 30/393 |
| 2,917,088 | 12/1959 | Papworth | 74/50 X |
| 2,931,402 | 4/1960 | Papworth | 30/393 |
| 3,457,796 | 7/1969 | Leach | 30/393 X |
| 4,137,632 | 2/1979 | Pfanzer | 30/393 |

FOREIGN PATENT DOCUMENTS

| | | | |
|---|---|---|---|
| 1279923 | 10/1968 | Fed. Rep. of Germany | 30/394 |
| 2650470 | 5/1978 | Fed. Rep. of Germany | 30/394 |

*Primary Examiner*—Jimmy C. Peters
*Attorney, Agent, or Firm*—Craig & Antonelli

[57] ABSTRACT

A keyhole type saw is provided which includes transverse stroke control apparatus for controlling the movement of the saw blade in a direction transverse to the linear stroke path. According to preferred embodiments, the transverse stroke control apparatus includes a rotatable blade guide roll engageable directly with the saw blade, which guide roll is in turn carried at a guide lever arm. A rotary plate is supported in the housing of the saw and includes a pivot connection for a swing arm which has the other end engageable at the guide lever arm by way of cam surfaces, whereby the position of the swing arm directly controls the presenting transverse stroke of the blade guide roll and saw blades. To accommodate adjustment of the transverse travel path for the presenting stroke, the rotary plate is mounted about an axis spaced from the pivot axis for the swing arm, whereby simple rotational movement of the rotary plate adjusts the pivot axis of the swing arm, and therewith the presenting stroke of the guide roll against the rear of the saw blade.

13 Claims, 13 Drawing Figures

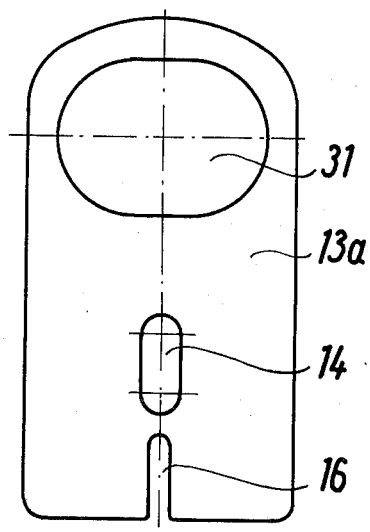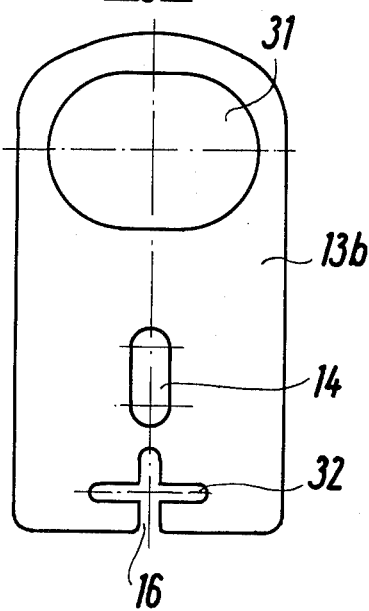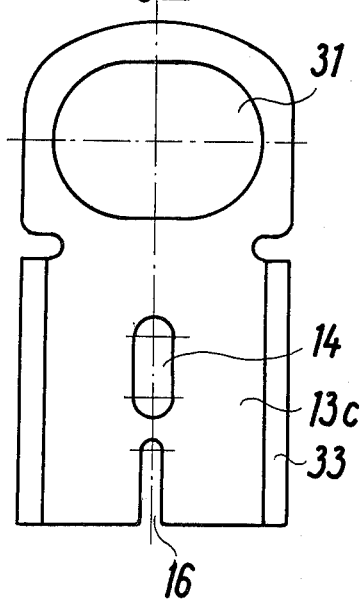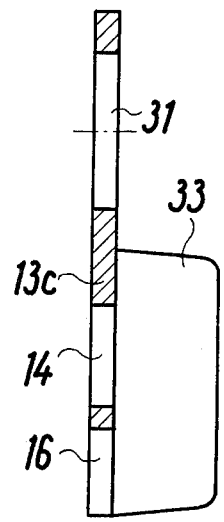

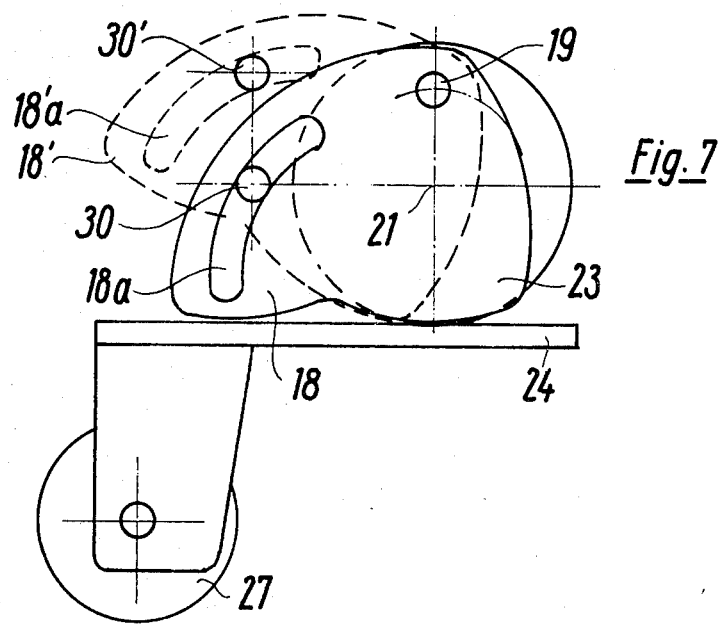
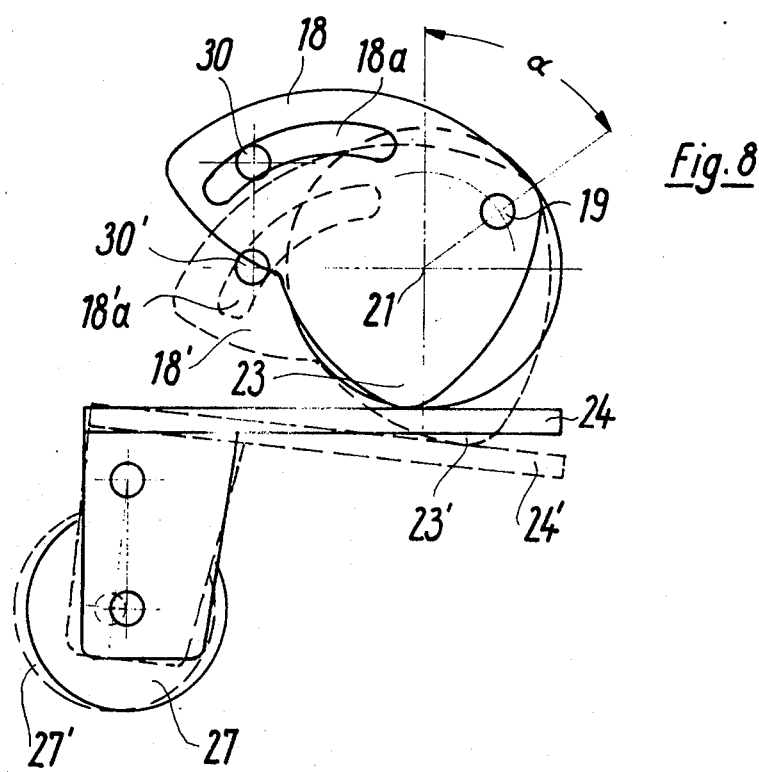

KEYHOLE SAW

BACKGROUND AND SUMMARY OF THE INVENTION

This application is a continuation-in-part application of U.S. patent application Ser. No. 932,858 filed Aug. 11, 1978 now abandoned.

The invention relates to a keyhole saw with a cam drive for the saw blade, whose cutting depth is adjustable via a supporting roll diposed on a swingable spring-loaded lever arm, being reciprocatingly movable by the camdrive, the movement being controllable by a setting device.

Keyhole saws of this general kind are known (German OS No. 1,626,899). They were developed in an effort to impart the saw blade, in the material-removing stroke and in the back stroke, supplementary components of motion in the cutting direction, in order to have better sawing action. In the known constructions, this supplementary presenting stroke is attained by an arrangement whereby a supporting roll is applied to the back of the saw blade, which is moved forward and backward via an angle lever, by another lever which is disposed on the drive cam, or that is touched and swung by it during the turning movement of the cam. To set the amount of the presenting stroke, there is provision of another cam which is turned from the outside, which cam is in contact with the end of the angle lever and can disengage it from the drive lever. The disadvantage in the known device consists in that this adjustment of the presenting stroke is possible only to a certain degree. Besides, there is the circumstance that the forward and backward motion, especially with short forward strokes, does not occur continuously, and occurs only in specific positions of the saw blade, and this is not optimal withrespect to the effectiveness of the presenting motion. In addition, there are unwanted vibrations which are produced by the angle lever driven by the cam, said lever being moved crosswise with reference to the plane of the saw. These vibrations can affect cutting precision.

Other constructions have similar arrangements (U.S. Pat. No. 2,931,402). There, however, the length of the presenting stroke is not adjustable in the course of operation, because at least a partial disassembling of the instrument is involved for this. A drawback that is common to all known constructions is that this supplementary device that triggers the presenting stroke requires extra space, especially because extra drive levers have to be associated with the cam, and they have to be guided downward in the region of the support rolls, inside the saw housing.

Proposals for managing the presenting stroke of the saw blade in other ways are also known (U.S. Pat. No. 3,863,343). In these arrangements, a certain curvature is given to the saw blade carrier which has the saw blade so that in its reciprocating motion that is balanced out by a counterweight that also moves reciprocally, it passes through a slightly curved path with its foward end, imparting the desired reciprocating and forward and backward movement to the saw blade. These constructions have the drawback, however, that the length of the presenting stroke is not adjustable.

The present invention concerns the problem of producing a keyhole saw in which the space requirement for actuation of a device for control of the presenting stroke can be kept minimal, and in which a simple continuous adjustment of the stroke will be possible even in the course of operation.

The invention contemplates providing preferred embodiments wherein the adjusting device comprises an adjustable rotary plate whereon a swing arm with a control cam applied to the lever arm is disposed eccentrically to the pivot point of said swing arm, the cam being of such configuration that, depending upon the position of the rotary plate, it can moved out by an adjustable amount, beyond an imaginary circle whereof the midpoint is the axis of rotation of the rotary plate, its radius corresponding to the distance of the axis of rotation to the lever arm in its starting position in which the support roll does not force any presenting stroke on the saw blade. By this arrangement, it is possible very elegantly to have a smooth adjustment of the presenting stroke which additionally, because of the control cam that remains constantly engaged during the whole saw blade stroke, occurs continuously, and hence, affords much better efficiency for the saw. It is advantageously provided that the swing arm will be driven immediately from a counterweight that moves reciprocatingly and is driven by a cam drive, penetrating into the zone of the support roll. The invention thereby exploits the circumstance that a counterweight is moved in opposition to the reciprocating movement of the saw blade and its carrier, said counterweight being so incorporated that it extends into the lower region where the support roll is pivotably disposed. It is then possible in a very simple way to manage an adjustable drive for the support roll which requires only a little extra space. Thereby, additional angle levers for driving the presenting stroke device can be saved. Advantageously, the axis of the rotary plate can lie parallel to the axis of the support roll, and the swing arm can be disposed with the control cam in the plane of the saw blade. The rotary plate, seen outward from the saw blade, is preferably seated behind the counterweight, in a recess in the housing. Thereby, there can be a very stable arrangement with short levers, where motions occur only in the plane of the saw. The exertion of force by the short lever arm occurs only in the forward thrust direction of the support roll so that unwanted transverse vibrations and imbalances created thereby are avoided. The rotary plate and the swing arm are preferably borne directly on the housing.

The swing arm with the control cam can in itself be reciprocatingly moved in any way, out from the counterweight. An acceptable guide that is very quiet is provided, according to preferred embodiments with the swing arm with the control cam held in a slitlike groove on a pin that is seated on the counterweight parallel to the pivot axis of the swing arm. Thereby, there is still another quite particularly simple embodiment, if the pin is seated in the counterweight in a slit recess running in the direction of the motion of the stroke, in which the swing arm groove engages. In this way, also the least possible space is required for disposition of the swing arm, because it is moved in part within the zone of the counterweight. The pin can also be held in a cruciform recess of a middle plate part which can be supplemented by two laterally set off plate parts, to make the whole counterweight, according to particularly preferred embodiments. By this configuration, there is on the one hand a very simple fixation of the pin, and on the other hand there is also a very simple and inexpensive construction of the counterweight. One of the outer plate parts, namely the one turned toward the saw blade carrier, is preferably advantageously also made as a U-shaped piece whose projecting extremity can laterally surround the drive shaft for the saw blade. This arrangement has the effect in the first placed that the total space requirement for the counterweight is kept very small, and in the second place the maximum torque exerted about the drive cam by the counterweight relative to the saw blade drive shaft will be reduced or substantially counterbalanced because of the shift of the overall center of gravity of the counterweight.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIGS. 3 to 6 are detail views of the plate parts used to make the counterweight for the saw of FIG. 1;

FIG. 7 is a side view of another embodiment of a control of the support roll for the presenting stroke with a swing arm that is not made as a fork, in the position of foward stroke zero;

FIG. 8 is the device of FIG. 7, but in the setting in which the saw blade executes its maximal forward stroke;

DETAILED DESCRIPTION OF THE PREFERRED EMBODIMENT

Figure 1:
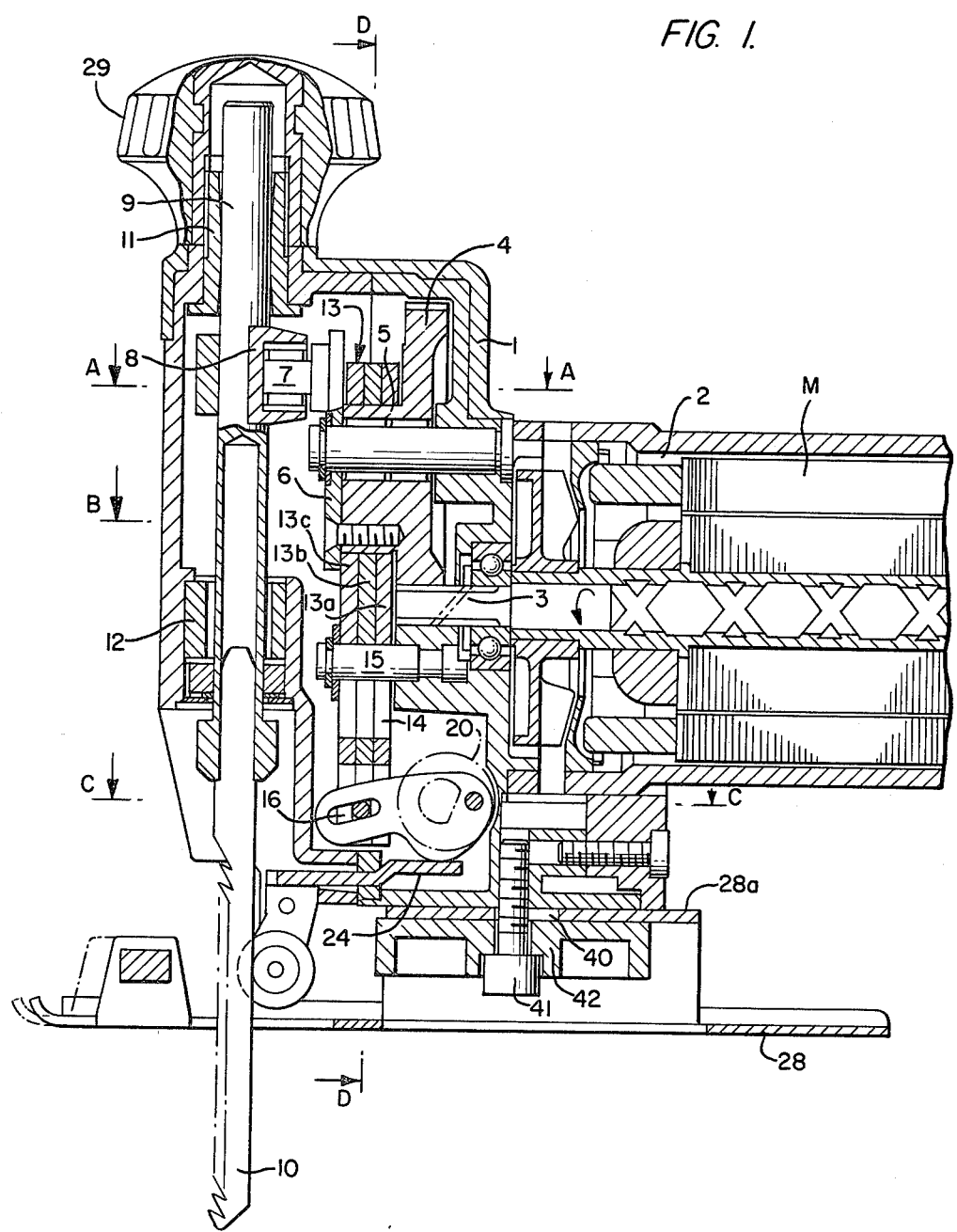
FIG. 1 is a longitudinal sectional view through a keyhole saw constructed according to a first preferred embodiment of the present invention in which a swing layer provided with a fork engages the counterweight.
Figure 2:
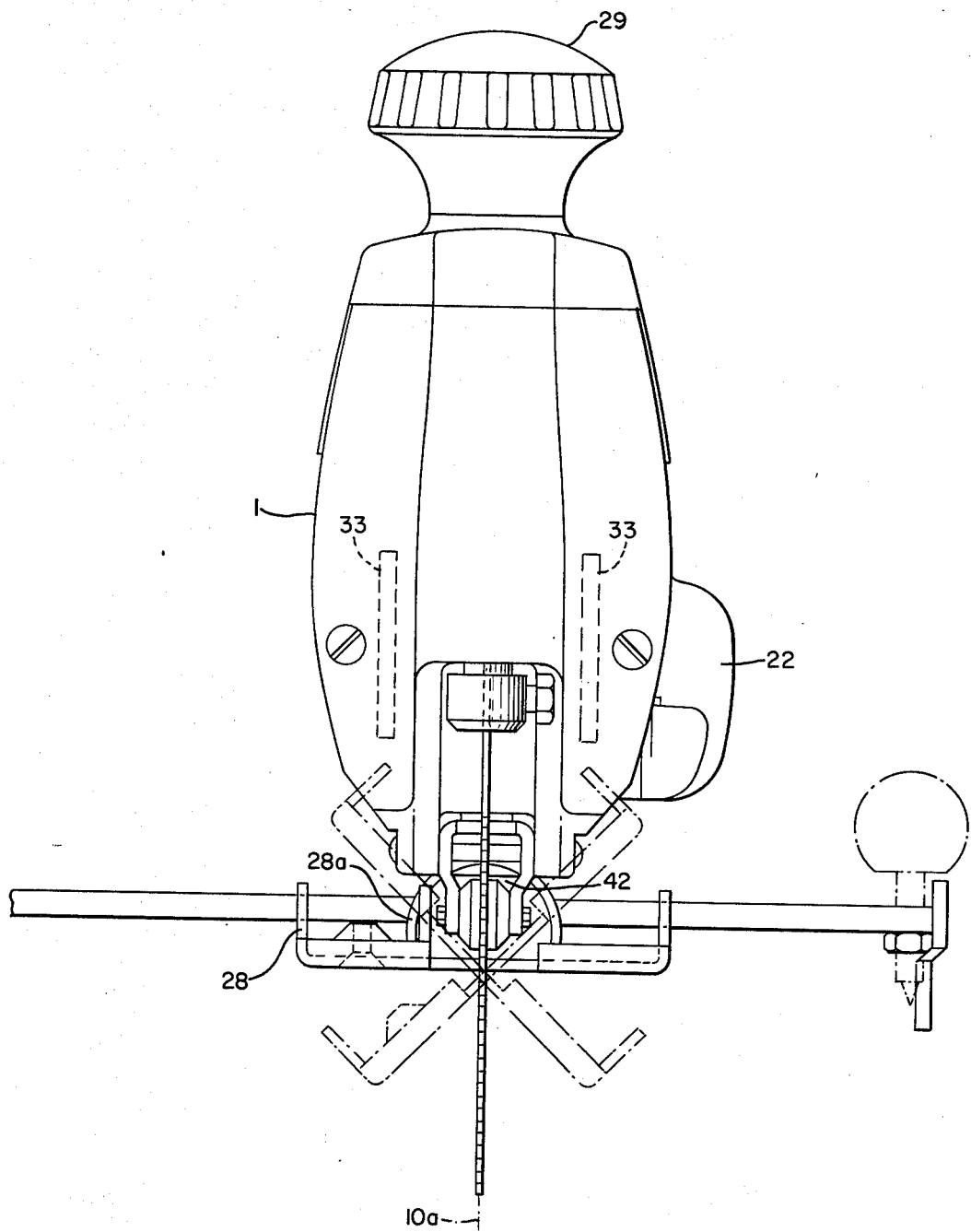
FIG. 2 is a front view of the keyhole saw of FIG. 1.
Figure 9:
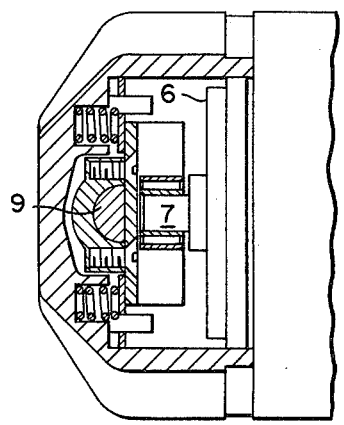
FIG. 9 is a partial sectional view taken along line A—A in FIG. 1.
Figure 10:
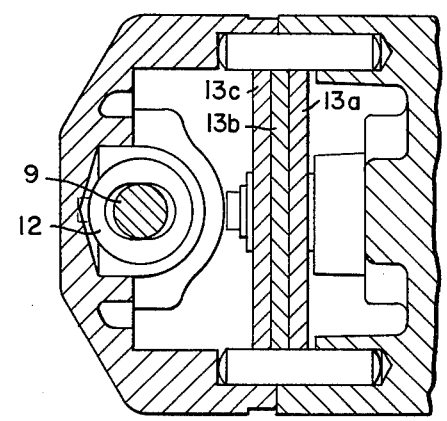
FIG. 10 is a partial sectional view taken along line B—B in FIG. 1.
Figure 11:
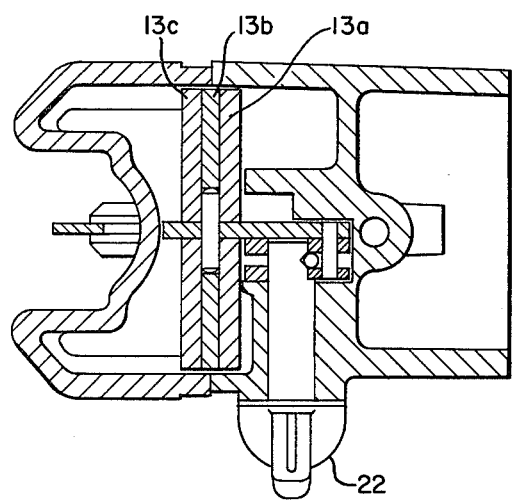
FIG. 11 is a sectional view taken along line C—C of FIG. 1.
Figure 12:
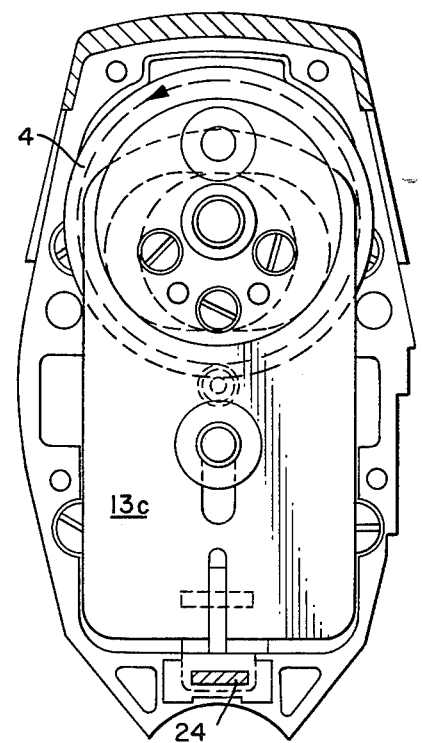
FIG. 12 is a sectional view taken along line D—D of FIG. 1.

In FIGS. 1 and 2, a keyhole saw is shown which has a housing 1 for an electric motor M (motor M only schematically depicted) disposed within space 2, which motor M drives a gear 4 via a drive gear 3, said gear 4 being provided with a cam 5. Cam 5 is fixedly connected with a crank 6 which engages with a crank pin 7 in a horizontally running guide track of a U-shaped member 8, which is fixedly connected with the drive shaft 9 of a keyhole saw blade 10. Said saw blade 10 is moved up and down in the plane 10a of the saw (see FIG. 2). Drive shaft 9 is guided at its upper and lower ends in respective bearings 11 and 12, which, however, are of such configuration that drive shaft 9 can execute a certain forward and backward movement with reference to its long axis, in the plane of the drawing. To accommodate this forward and backward movement, upper bearing 11 is made slightly convex and lower bearing 12 is not rigidly fixed. Bearings of this general kind are known.

On cam 5 there is seated a counterweight 13 which, as FIGS. 3 t 6 show, is made up of various individual plate parts. This counterweight 13 is slidably guided with a long slit 14 on a pin 15 that is fixed on the housing, and at its lower end it presents a central recess 16 which makes room for an end of a swing lever 18, in which a groove 17 is formed. The swing lever 18 is swingably disposed via a pin 19 on a rotary plate 20 that is rotatably borne in housing 1. The lever is in plane 10a of the saw, and plate 20 as seen from the observer's viewpoint is seated behing the lever and borne with its shaft 21 on housing 1. Shaft 21 of plate 20 leads laterally out of housing 1 and is fixedly connected with a switch lever 22 that allows a smooth adjustment of the position of rotary plate 20.

Figure 13:
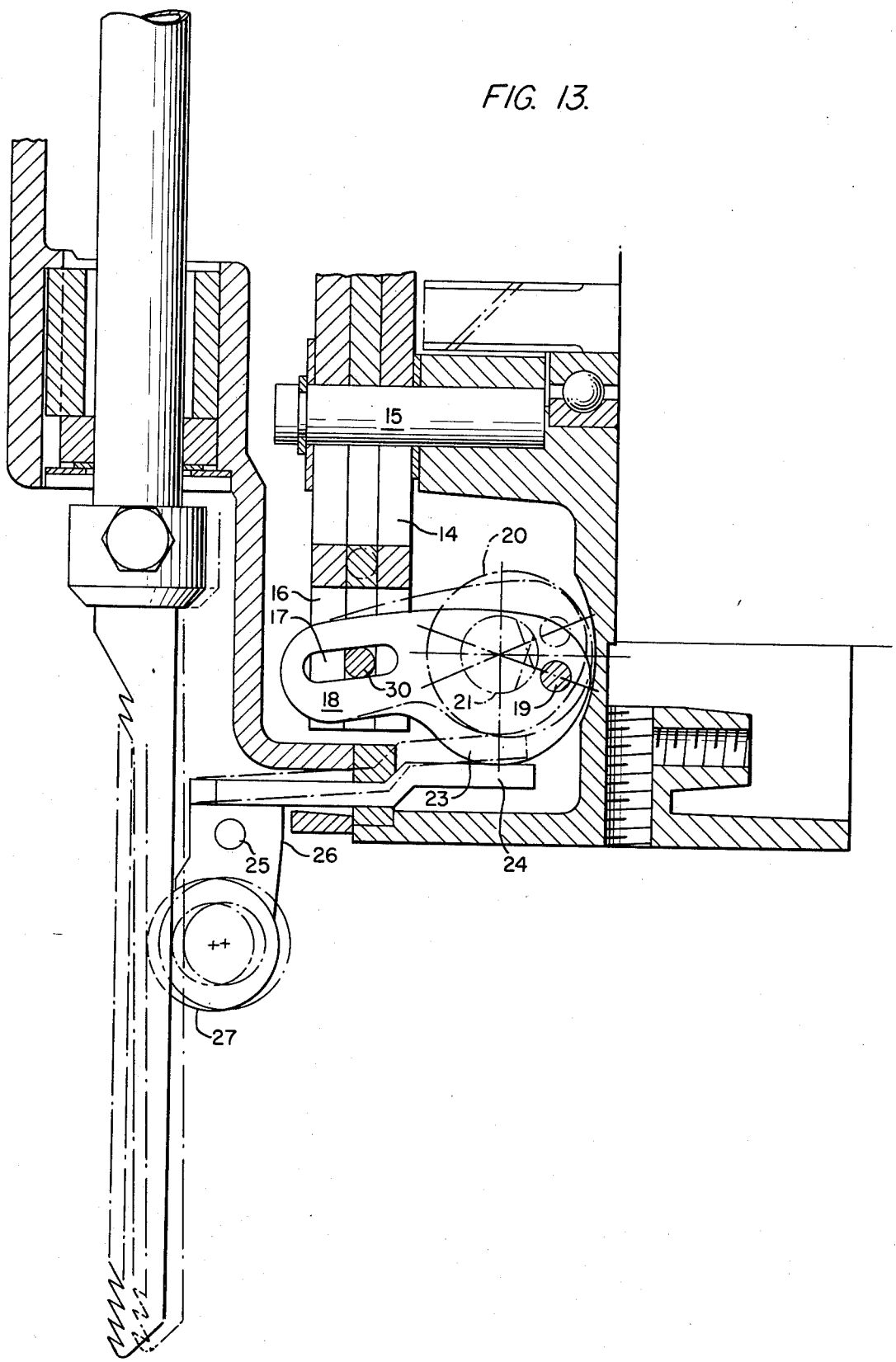
FIG. 13 is a view of a detail of FIG. 1 on an enlarged scale.

Swing arm 18 is also provided with a control cam 23 which, in the solid line illustration of FIG. 13 of pin 19 and rotary plate 20, is in its downwardly displaced position. In this illustrated position, control cam 23 therefore is applied to the free end of a lever arm 24 which is borne swingably about pin 25, and receives a rotatable support roll 27 in a forklike retaining part 26, said roll has a circumferentially extending middle groove in which the back of saw blade 10 is guided. The keyhole saw is also provided with a guide frame 28 which has a slit for passage of saw blade 10 and which is adjustably connected to housing 1 to be movable between the broken line and solid line positions illustrated in FIG. 2 by way of a laterally extending T-shaped slot 40. For use in a horizontal orientation, the screw 41 is tightened so as to be fixed within the base of the T-shaped groove. To shift the guide frame 28 to either of the broken line angularly oriented positions shown in FIG. 2, the guide frame 28 is displaced rearwardly from the broken line position in FIG. 1 to the solid line position in FIG. 1 whereat the screw 41 is aligned with the laterally extending top of the T-shaped groove so that the guided frame 28 can then be slid upon the mounting block 42 to the desired lateral position at which time the screw 41 can be resecured clamping the arcuate portion 28a of the guide frame 28 between the housing 1 and the mounting block 42. The keyhole saw is grasped for operation by an upper knob 29 and the cylindrical housing part 2 which holds the drive motor M.

Operation of the saw is as follows:

With the turning of gear 4, cam 5 is also turned, and moves drive shaft 9 with saw blade 10 up and down, and in the second place it precisely moves counterweight 13 in the opposite direction. For this counterweight control, the cam 5 is so disposed that it is diametrically opposite pin 7 of drive crank 6. A pin 30 seated in a recess 16 is guided in a groove 17 of swing arm 18, the axis of said pin being parallel to the axis of rotary plate 20, said pin being seated in counterweight 13 in a way that is to be explained later on. With each upward and downward movement of counterweight 13, i.e., with each stroke of saw blade 10, swing arm 18 is pivoted about its axis 19. In the illustrated position it, therefore, presses lever arm 24 more or less downward with its control cam 23, so that support roll 27 during the stroke of saw blade 10 will be pressed against the back of blade 10 and thus during the stroke it leads to a reciprocating movement of the saw blade. The amount of the presenting stroke now depends upon the adjustment of rotary plate 20 by means of switching lever 22. If there is counterclockwise turning, from the position of FIG. 1, the swing axis of arm 18 will move farther upward, into a zone from which the swing motion of arm 18 will be insufficient to move control cam 23 downward along the periphery of rotary plate 20. For this reason, the end of lever arm 24 is applied to the periphery of rotary plate 20, and support roll 27 executes no presenting motion during the stroke of saw blade 10, so that saw blade 10 likewise executes no forward or backward stroke. By turning rotary plate 20, depending upon the position of swing axis 19, the control cam 23 can extend beyond the periphery of rotary plate 20, with a swing motion of arm 18, so that there will be a smooth adjustment of the length of the presenting stroke of saw blade 10, by the amount of the swing motion of lever arm 24.

The arrangement is such that the space occupied by counterweight 13 will be utilized at least in part for lodging swing arm 18, which penetrates into a recess in counterweight 13. Since there is space behind the counterweight to accommodate rotary plate 20, the new configuration requires no extra place for disposition of a drive angle lever for support roll 27. At the same time, with the illustrated embodiment, it is likewise possible to have a very quiet drive for the support roll, in which force transmission no large lever arm is necessary, which could damage drive parts and be the cause of unwanted vibrations. Swing arm 18 and its adjustment structure is easy to actuate, but it is not sensitive to frequent reciprocating motions that occur in course of operation. Since the swing arm lies in the plane 10a of the saw, there are no crosswise vibrations in its movement that could cause undesired imbalances.

As FIGS. 3 to 6 show, counterweight 13 consists of three individual platelike parts 13a, 13b and 13c, which all on the one hand present the same slitlike recess 14 for pin 15, and on the other hand the same rather oval recess 31 in which cam 5 is guided. The height of recess 31, i.e. its smaller dimension, thereby corresponds to the measurement of cam 5 in this direction, while the other dimension, namely the width of recess 31, is so selected that the cam can be moved freely toward the sides in its movement of rotation. Counterweight 13 is therefore only moved back and forth vertically.

In the lower region, all three plate parts 13a, 13b and 13c present a vertically directed slit recess which together constitutes recess 16 when the individual plate parts are joined together. Middle plate part 13b also has a transverse slit 32, so that on the whole there is a cruciform slit consisting of recesses 16 and 32. In putting together the individual plate parts 13a to c, pin 30 is laid lengthwise in recess 32, so that after the joining of the two lateral parts 13a and 13c it will be held in this recess. Special fastening processes are unnecessary. Plate part 13c which is turned toward drive shaft 9 (left most part in FIG. 1) is also made in a U-shape, at least in its lower region, and has two projecting extremities 33 that laterally enclose drive shaft 9 or a corresponding bulge of the housing. In FIG. 2 the region is indicated in dashed lines, where the projecting extremity 33 of the counterweight 13 can move next to the drive shaft. This arrangement offers the advantage that the space for the counterweight, required in addition to the drive shaft, can be kept smaller, because part of the counterweight can be laid in the space around the drive shaft. For this reason there is a very compact construction of the whole saw, which together with the arrangement of rotary plate 20 and swing arm 18 can be made very small and easy to handle in spite of its adjustment capability. Because of the projecting extremity 33, the center of gravity of counterweight 13 is also shifted in the direction of the axis of the drive shaft 9 so that the maximum torque occurring between the counterweight 13 and drive shaft 9 because of the eccentric drive can be reduced. Especially, if extremity 33 is made correspondingly heavy. However, the use of projecting extremities is entirely optional and thus only a flat plate counterweight 13c is shown in FIGS. 1 and 10-12.

FIGS. 7 and 8 show another possibility for the arrangement of lever arm 24 and its control cam 23. In the embodiment of FIGS. 7 and 8, as also in embodiment of FIG. 1, lever arm 24 is spring loaded counterclockwise against control cam 23 of swing arm 18 at its free end, has a slit 18a with which it is guided on pin 30. The function is otherwise the same, and the two extreme positions are indicated in solid and dashed lines respectively in FIGS. 7 and 8.

Here, FIG. 7 shows the setting of swing arm 18 with control cam 23 in the position in which support roll 27 executes no movement, in spite of the swing movement of swing arm 18. In this position, swing arm 18 is swung about pivot point 19 which is displaced upward in the place above turning axis 21 of rotary plate 20, by corresponding setting of rotary plate 20. As FIG. 7 shows, with the up and down movement of the pin 30 (30') which is disposed on the counterweight which is not shown, swing arm 18 is swung along with it. Control cam 23 thereby slides with its surface 23a which is made as an arc about swing shaft 19, on lever arm 24 without swinging it. The swing arm is moved from its position 18 to position 18' but lever arm 24 is not moved in spite of this.

FIG. 8 clearly shows that these kinematic relationships change completely if pivot point 19 of swing arm 18 is brought into its lower end position, in which after a turning of plate 20 by angle α, it is distant about 30 to 40 degrees from the vertical plane passing through axis of rotation 21. In this position, control cam 23 is moved from an end position in which swing arm 18 assumes the upper position, into its lower end postion 23' in which the swing arm and the guide slit for pin 30 assume the position 18' or 18a' respectively. The lever arm is thereby moved into position 24', so that the support roll reaches position 27' in which it is swung clockwise with reference to the starting position, by the magnitude of the maximum transverse stroke. With this arrangement there is a constant contact between lever arm 24 and the control cam 23: nevertheless, the magnitude of the presenting stroke is continuously adjustable. This arrangement offers the advantage that the presenting stroke movement occurs continuously over the whole long stroke of the saw blade and not, as is the case in known constructions, only over partial lengths of the long stroke.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Keyhole type saw including a saw blade, drive means for drivingly moving said saw blade back and forth in a generally linear path in the plane of the saw blade, and supplementary transverse stroke control means for controlling said saw blade to move in said saw blade plane in directions transverse to said linear path to improve the blade cutting action; wherein said transverse stroke control means comprises:

saw blade guide means directly engageable with the saw blade to control the transverse movement of the saw blade, a movable guide lever arm carrying said saw blade guide means, rotary plate means supported for pivotal movement about a rotary plate axis, swing arm means pivotally attached to said rotary plate means at a swing arm axis eccentrically spaced from said rotary plate axis, said swing arm means including control cam means engageable with a corresponding cam surface of said guide lever arm to control the position of said guide lever arm is dependence on the position of the swing arm means, and adjusting means for adjusting the rotative position of the rotary plate means about the rotary plate axis so as to adjust the position of the eccentrically spaced swing arm axis and therewith the control path of the saw blade guide means.

2. Saw according to claim 1, wherein said saw blade guide means is a rotatable support roll engageable with the rear edge of the saw blade.

3. Saw according to claim 1, wherein the drive means includes an eccentric drive, wherein the saw blade guide means is a rotatable support roll carried by the movable guide lever arm, and wherein the position of said guide lever arm is also controlled by the eccentric drive during operation of the saw.

4. Saw according to claim 3, wherein a counterweight is provided that is reciprocatingly moved by the eccentric drive, said counterweight extending into the region of the support roll and being in driving engagement with the swing arm means.

5. Saw according to claim 4, wherein the rotary plate axis is parallel to the axis of the support roll, and wherein the swing arm means with the control cam means is disposed in the saw blade plane.

6. Saw according to claim 5, wherein the rotary plate means, seen from the saw blade, is seated behind the counterweight in a housing recess.

7. Saw according to claim 6, wherein the swing arm means is held with a groove on a pin which is disposed on the counterweight and extends parallel to the swing arm axis.

8. Saw according to claim 7, wherein the pin is disposed in a slit in the counterweight that runs in the direction of the saw stroke, the groove of the swing arm engaging said pin.

9. Saw according to claim 8, wherein a middle plate part of the counterweight includes two mutually perpendicular recesses, one of said recesses being said slit for the pin.

10. Saw according to claim 9, wherein the counterweight includes an edge plate part turned toward a drive shaft of the saw blade, said edge plate part being made at least partially as a U shape, whose projecting extremities laterally enclose the drive shaft for the saw blade.

11. Saw according to claim 1, wherein the control cam means at least in part comprises a curved surface formed by an arc about the swing arm axis.

12. Saw according to claim 11, wherein the curved surface of the control cam means is made long enough so that it is applied to lever arm throughout the whole swing movement of the swing arm which this element executes in the presentation stroke zero position.

13. Saw according to claims 3 or 10, wherein the distance between the swing arm axis and the rotary plate axis is such as to permit continuous adjustment of the blade guide means between a zero stroke position where the blade guide means does not force the saw blade into a presenting stroke and a maximum stroke position where the blade guide means forces the saw blade into a maximum presenting stroke.

* * * * *